(12) United States Patent
Kondo et al.

(10) Patent No.: US 8,051,939 B2
(45) Date of Patent: Nov. 8, 2011

(54) THROTTLE CONTROL APPARATUS FOR A VEHICLE AND VEHICLE INCORPORATING SAME

(75) Inventors: Tetsuya Kondo, Saitama (JP); Koichi Nozoe, Saitama (JP); Koichi Shimamura, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 295 days.

(21) Appl. No.: 12/387,810

(22) Filed: May 7, 2009

(65) Prior Publication Data

US 2009/0293668 A1    Dec. 3, 2009

(30) Foreign Application Priority Data

May 27, 2008    (JP) .................................. 2008-137983

(51) Int. Cl.
*B62D 61/02*    (2006.01)
(52) U.S. Cl. ............................ 180/219; 123/349; 74/485
(58) Field of Classification Search .................. 180/170, 180/219; 74/491, 484 R, 485–487, 501.5 R, 74/501.6, 504, 505, 507, 551.1–551.9; 123/349
See application file for complete search history.

(56) References Cited

U.S. PATENT DOCUMENTS

| | | | |
|---|---|---|---|
| 6,551,153 B1 * | 4/2003 | Hattori | 440/87 |
| 6,978,694 B2 * | 12/2005 | Peppard | 74/489 |
| 7,287,512 B2 * | 10/2007 | Possehl et al. | 123/400 |
| 7,735,470 B2 * | 6/2010 | Palfenier et al. | 123/400 |
| 2004/0216550 A1 | 11/2004 | Fallak et al. | |
| 2007/0157902 A1 * | 7/2007 | Possehl et al. | 123/400 |
| 2007/0182514 A1 * | 8/2007 | Brandl et al. | 335/37 |

FOREIGN PATENT DOCUMENTS

| | | |
|---|---|---|
| EP | 1 464 571 A2 | 10/2004 |
| JP | 2554808 | 8/1997 |
| JP | 2003-252273 | 9/2003 |

* cited by examiner

*Primary Examiner* — Paul N Dickson
*Assistant Examiner* — Tashiana Adams
(74) *Attorney, Agent, or Firm* — Carrier Blackman & Associates, P.C.; Joseph P. Carrier; William D. Blackman

(57) ABSTRACT

A throttle control apparatus includes a throttle control sleeve rotatably mounted on a handlebar of a vehicle, a throttle control housing fixed to the handlebar, and a throttle sensor unit housed in the throttle control housing. The throttle sensor unit is operable to detect a rotational angle of the throttle control sleeve. The throttle control housing is rotatably engaged with an outer periphery of the throttle control sleeve. The throttle sensor unit includes a rotary member having a spline hole formed therein, a fixed contact and a movable contact for detecting rotation of the rotary member. The throttle control sleeve and the throttle sensor unit are engaged with each other by spline fitting. A throttle return mechanism and the sensor unit are arranged in an overlapping manner in an axial direction. Handle switches are arranged on a vehicle body center side of the throttle control housing.

20 Claims, 5 Drawing Sheets

THROTTLE CONTROL APPARATUS FOR A VEHICLE AND VEHICLE INCORPORATING SAME

CROSS-REFERENCE TO RELATED APPLICATIONS

The present invention claims priority under 35 USC 119 based on Japanese patent application No. 2008-137983, filed on May 27, 2008. The entire subject matter of this priority document, including specification, claims and drawings, is incorporated by reference herein.

BACKGROUND OF THE INVENTION

1. Field of the Invention

The present invention relates to a throttle control apparatus for a vehicle, such as a motorcycle, and to a vehicle incorporating same. More particularly, the present invention relates to a throttle control apparatus, in which a throttle control sleeve, rotatably supported on a handlebar of the vehicle, and a throttle sensor unit disposed in a throttle control housing are engaged with each other by a spline fitting. The throttle control apparatus may be assembled with the handlebar by sub-assembling the throttle sensor unit onto the throttle control sleeve.

2. Description of the Background Art

There is a known throttle control apparatus, which by using a sensor, allows a rider of a vehicle, such as a motorcycle, to detect a throttle operation quantity by detecting a rotational angle of a throttle control sleeve which is operatively associated with a handlebar of the vehicle.

The Japanese Patent Document JP-A-2003-252273 discloses a throttle control apparatus having a ring on which a bevel gear formed on an end portion of a throttle control sleeve is mounted. The throttle control apparatus includes a body to be detected by a sensor which is meshed with the bevel gear of the ring. The body is rotated in the direction substantially orthogonal to the rotational direction of the throttle control sleeve, thereby detecting, by a sensor, a rotational angle of the body.

Further, the Japanese Utility Model Registration No. 2554808 discloses a throttle control apparatus which includes an annular potentiometer which is formed so as to wrap around a handlebar, and at the same time, engages a rotary member on which a movable contact of the potentiometer is formed with one end portion of a throttle control sleeve.

However, the respective throttle control devices as disclosed in the Japanese Patent Document JP-A-2003-252273 and the Japanese Utility Model Registration No. 2554808, each have a drawback because each of these systems requires a large number of parts. Accordingly, the structure of the throttle control apparatus is liable to become complicated.

Therefore, with respect to the acquisition of the structure of the throttle control apparatus which can realize assembling operation with high efficiency while ensuring high sensor accuracy, the systems disclosed in the Japanese Patent Document JP-A-2003-252273 and the Japanese Utility Model Registration No. 2554808 are still less than optimal. Particularly, a conventional throttle control apparatus cannot be mounted on the handlebar after sub-assembling the throttle sensor unit onto the throttle control sleeve.

The present invention has been made to overcome such drawbacks of existing throttle control devices. Accordingly, it is one of the objects of the present invention to provide a throttle control apparatus which can be assembled on a handlebar in a state that a throttle control sleeve, which is rotatably and pivotally supported on the handlebar, and a throttle sensor unit which is housed in a throttle control housing are engaged with each other by spline fitting, and during vehicle assembly, the throttle sensor unit is sub-assembled onto the throttle control sleeve.

SUMMARY OF THE INVENTION

In order to achieve the above objects, the present invention according to a first aspect thereof provides a throttle control apparatus including a throttle control sleeve which is rotatably mounted onto a handlebar of a vehicle, a throttle control housing which is fixed to the handlebar and is rotatably engaged with an outer periphery of the throttle control sleeve, and a throttle sensor unit which is housed in the throttle control housing. The throttle sensor unit is operable to detect a rotational angle of the throttle control sleeve. A spline is formed on an outer peripheral surface of one end portion of the throttle control sleeve in the axial direction. The throttle sensor unit has an annular shape having a spline hole formed at a substantially center thereof. The throttle control sleeve and the throttle sensor unit are engaged with each other by a spline fitting.

The present invention according to a second aspect thereof, in addition to the first aspect, further includes a throttle return mechanism for applying a biasing force in the direction that the throttle control sleeve is made to return to an initial position thereof. The throttle return mechanism is arranged adjacent to the throttle sensor unit, and is engaged with the throttle control sleeve by spline fitting.

The present invention according a third aspect thereof is characterized in that the throttle sensor unit and the throttle return mechanism are arranged in an overlapping manner in an axial direction of the throttle control sleeve by engaging a projecting portion (a cylindrical projection) which is formed on the throttle return mechanism with a recessed portion which is formed on the throttle sensor unit.

Further, the present invention according a fourth aspect thereof is characterized in that the throttle sensor unit includes a rotary member having a spline hole formed therein, a detection member which detects a quantity of rotation of the rotary member, and a sensor housing which houses the rotary member and the detection member, and is mounted in the throttle control housing in a non-rotatable manner.

Still further, the present invention according to a fifth aspect thereof is characterized in that at least one handle switch is mounted on the throttle control housing, that the throttle sensor unit and the throttle return mechanism are arranged on a vehicle-body outer side of the throttle control housing, and the at least one handle switch is arranged on a vehicle-body center side of the throttle control housing.

ADVANTAGES OF THE INVENTION

According to the first aspect of the present invention, the spline is formed on the outer peripheral surface of the one end portion of the throttle control sleeve in the axial direction, the throttle sensor unit is formed in an annular shape including the spline hole at a substantially central portion (at center) thereof, and the throttle control sleeve and the throttle sensor unit are engaged with each other by spline fitting. Hence, the assembling operation of the throttle sensor unit and the throttle control sleeve can be easily performed, and at the same time, the throttle sensor unit and the throttle control sleeve can be simultaneously mounted on the handlebar in a state that both parts are assembled with each other.

Accordingly, the assembling operation of the throttle control apparatus can be performed with high efficiency. Further, the throttle control sleeve and the throttle sensor unit are engaged with each other by spline fitting. Hence, even when a force for moving the throttle control sleeve in the axial direction is applied to the throttle control sleeve, there is no possibility that the force is transmitted to the throttle sensor unit.

According to the second aspect of the present invention, the throttle control apparatus includes the throttle return mechanism for applying a biasing force in the direction that the throttle control sleeve is made to return to an initial position thereof, and the throttle return mechanism is arranged adjacent to the throttle sensor unit and is engaged with the throttle control sleeve by spline fitting. Hence, the throttle sensor unit and the throttle return mechanism can be mounted on the handlebar after simultaneously assembling these parts on the spline of the throttle control sleeve. Accordingly, the assembling operation of the throttle control apparatus can be performed with high efficiency.

According to the third aspect of the present invention, the throttle sensor unit and the throttle return mechanism are arranged in an overlapping manner in the axial direction of the throttle control sleeve due to the engagement of the projecting portion which is formed on the throttle return mechanism and the recessed portion which is formed on the throttle sensor unit. Hence, a total cumulative size including a size of the throttle sensor unit and a size of the throttle return mechanism in the axial direction can be reduced, thus realizing the miniaturization of the throttle control housing.

According to the fourth aspect of the present invention, the throttle sensor unit includes the rotary member having the spline hole formed therein, the detection member which detects a quantity of rotation of the rotary member, and the sensor housing, which houses the rotary member and the detection member, is mounted on the throttle control housing in a non-rotatable manner. Hence, the throttle sensor unit and the throttle control sleeve can be simultaneously mounted on the handlebar by engaging these parts with each other by spline fitting after performing the assembling of the throttle sensor unit.

Further, even when a force for moving the throttle control sleeve in the axial direction is applied to the throttle control sleeve, the force is not transmitted to the rotary member. Hence, there exists no possibility that the force influences sensor accuracy of the detection member, the sealing property of the sensor housing and the like.

According to the fifth aspect of the present invention, at least one handle switch is mounted on the throttle control housing, the throttle sensor unit and the throttle return mechanism are arranged on a vehicle-body outer side of the throttle control housing, and the handle switch is arranged on a vehicle-body center side of the throttle control housing. Hence, the handle switches can be mounted in the throttle control housing by effectively utilizing the space in the inside of the throttle control housing, and thus realizing the miniaturization of the throttle control housing.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION OF ILLUSTRATIVE EMBODIMENTS

An illustrative embodiment of the present invention will now be described, with reference to the drawings. Throughout this description, relative terms like "upper", "lower", "above", "below", "front", "back", and the like are used in reference to a vantage point of an operator of the vehicle, seated on the driver's seat and facing forward. It should be understood that these terms are used for purposes of illustration, and are not intended to limit the invention.

Hereinafter, an illustrative embodiment of the present invention is explained in detail in conjunction with attached drawings.

Figure 1:
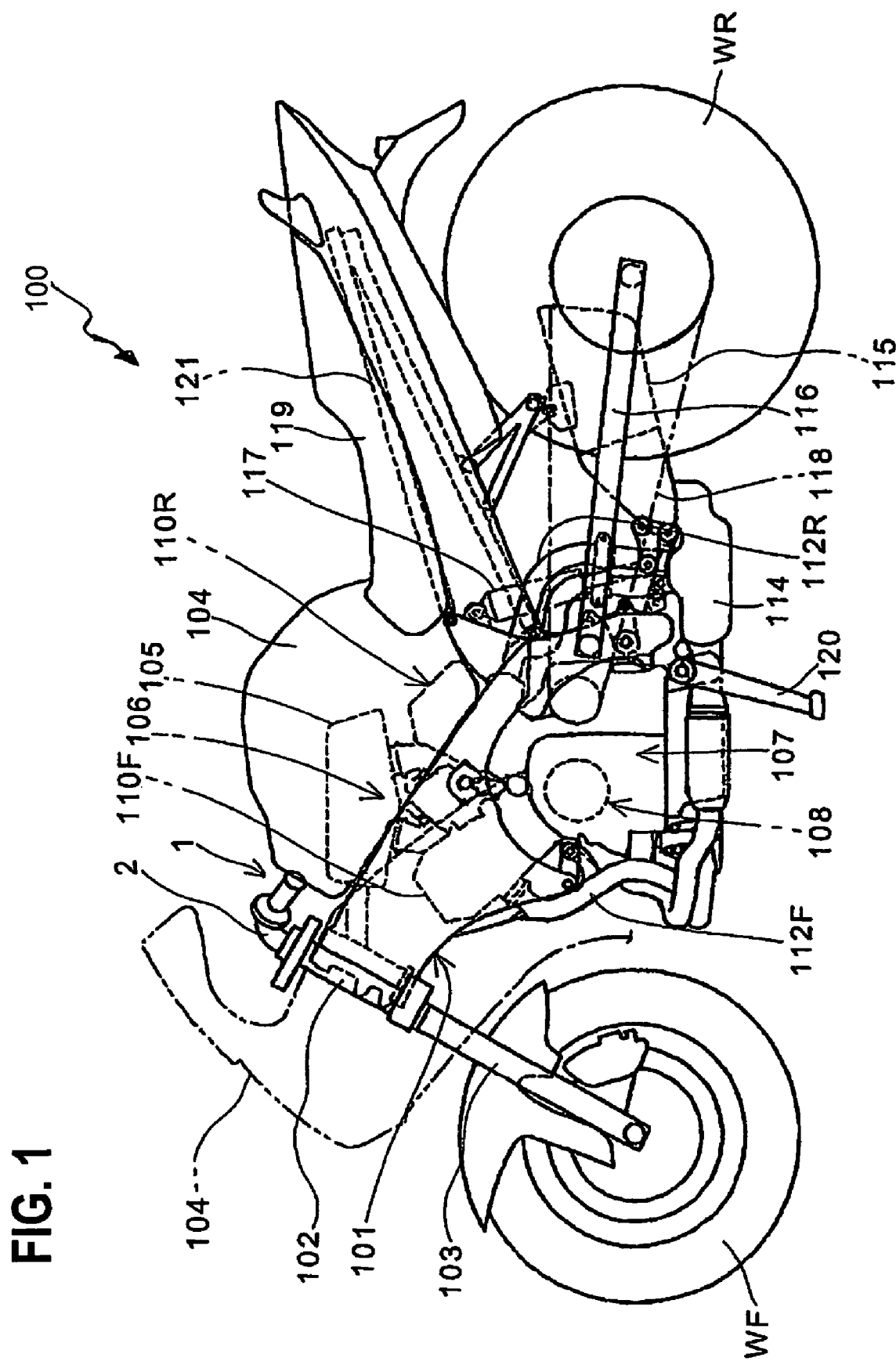
FIG. 1 is a side view of a motorcycle including a throttle control apparatus according to an illustrative embodiment of the present invention.

FIG. 1 is a side view of a motorcycle 100 which includes a throttle control apparatus 1 according to the illustrative embodiment of the present invention. A head pipe 102 is formed on a vehicle-body front portion of a vehicle body frame 101. A pair of left and right front forks 103 is steerably and pivotally supported by the head pipe 102. A front wheel WF is rotatably and pivotally supported on the front forks 103. The front wheel WF is operable to be steered by a handlebar 2 mounted on upper end portions of the front forks 103. The throttle control apparatus 1 is mounted on a right side of the handlebar 2 which extends in a vehicle width direction.

An upper cover 104 is arranged on an upper portion of the vehicle body frame 101. A vehicle-body front side of the head pipe 102 is covered with a cowling (upper cover) 104. A V-type 4-cylidner engine is mounted on a lower portion of the vehicle body frame 101. A crankshaft 108 of the V-type 4-cylidner engine 107 is arranged in a vehicle width direction. Inside the upper cover 104, in addition to a fuel tank (not shown), an air cleaner box 105, a fuel injection device 106 which supplies fuel to intake ports of a front cylinder 110F and a rear cylinder 110R of the engine 107 and the like, are housed.

An exhaust gas discharged from the front cylinder 110F is supplied to an expansion chamber 114 through a front exhaust pipe 112F, and an exhaust gas discharged from the rear cylinder 110R is supplied to the expansion chamber 114 through a rear exhaust pipe 112R. The exhaust gas which is supplied to the expansion chamber 114 is discharged to a rear side of the vehicle body via a muffler 115.

A seat frame 121, which supports a seat 119 thereon, is mounted on a rear upper portion of the vehicle body frame 101. A swing arm 116 which rotatably and pivotally supports a rear wheel WR is swingably and pivotally supported on a rear lower portion of the vehicle body frame 101. The swing arm 116 is suspended downwardly from the vehicle body frame 101 using a rear shock unit 117. A rotary drive force of the engine 107 is transmitted to the rear wheel WR via a drive chain 115. A side stand 120, which supports a vehicle body when the vehicle is parked, is mounted on a portion of vehicle body frame 101 located below a swing axis of the swing arm 116.

Figure 2:
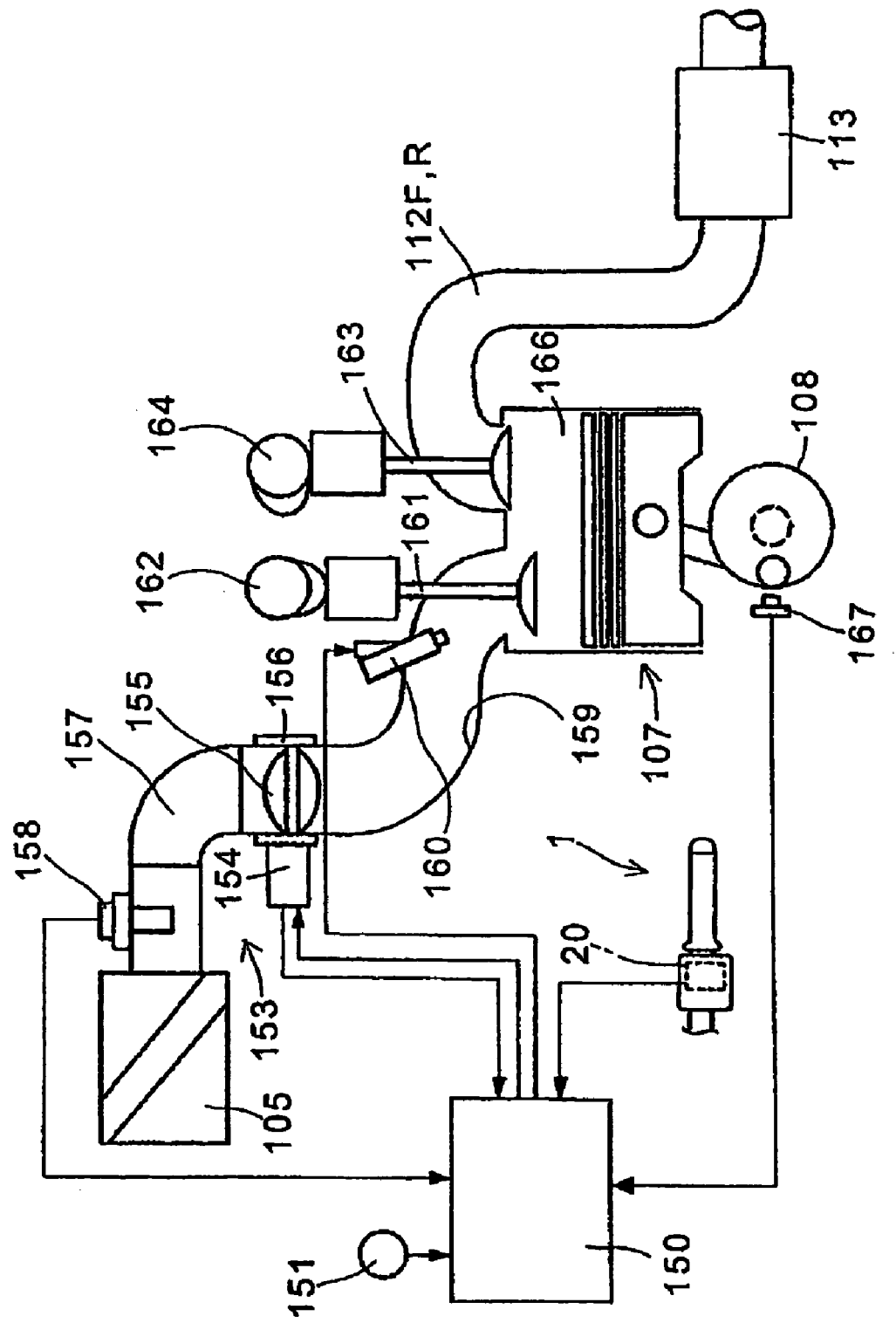
FIG. 2 is a system constitutional view of an engine.

FIG. 2 is a system constitutional view of the engine 107. In an intake pipe 157 of the engine 107, an electronic control throttle 153 which operates (i.e., opens and closes) a throttle valve 155 using an actuator 154 is interposed, and air is sucked inside combustion chambers 166 of the front and rear cylinders via the electronic control throttle 153 and an intake valve 161.

Exhaust gas is discharged from the combustion chamber 166 via an exhaust valve 163 and is purified by a catalyst device 113. Thereafter, the exhaust gas is discharged to atmosphere through the muffler 115. The intake valve 161 and the exhaust valve 163 are individually opened and closed by cams which are formed on an intake-side cam shaft 162 and an exhaust-side cam shaft 164, respectively.

An electromagnetic fuel injection valve 160 is mounted in an intake port 159 of each cylinder. When the fuel injection valve 160 is opened in response to an injection pulse signal, the fuel injection valve 160 injects fuel having a pressure adjusted to a predetermined pressure toward the intake valve 161.

A control unit 150 includes a micro-computer incorporated therein. The control unit 150 systematically controls the electronic control throttle 153, the fuel injection valve 160, an ignition device (not shown) and the like. The control unit 150 receives detection signals inputted by various sensors, such as an air flow meter 158 which detects a quantity of intake air into the engine 107, a throttle sensor unit (APS) 20 which detects a throttle opening of the throttle control apparatus 1, a crank angle sensor 167 which detects a rotational angle of the crankshaft 108, a throttle valve opening sensor 156 which detects an opening of the throttle valve 155, and a vehicle speed sensor 151 which detects a vehicle speed.

In addition, the control unit 150 receives the detection signals inputted by various sensors, e.g., a battery voltage signal, a brake operation signal and the like. During operation, the control unit 150 controls operation of the electronic control throttle 153 based on a throttle operation quantity inputted by a rider and the signals received from the various sensors.

Figure 3:
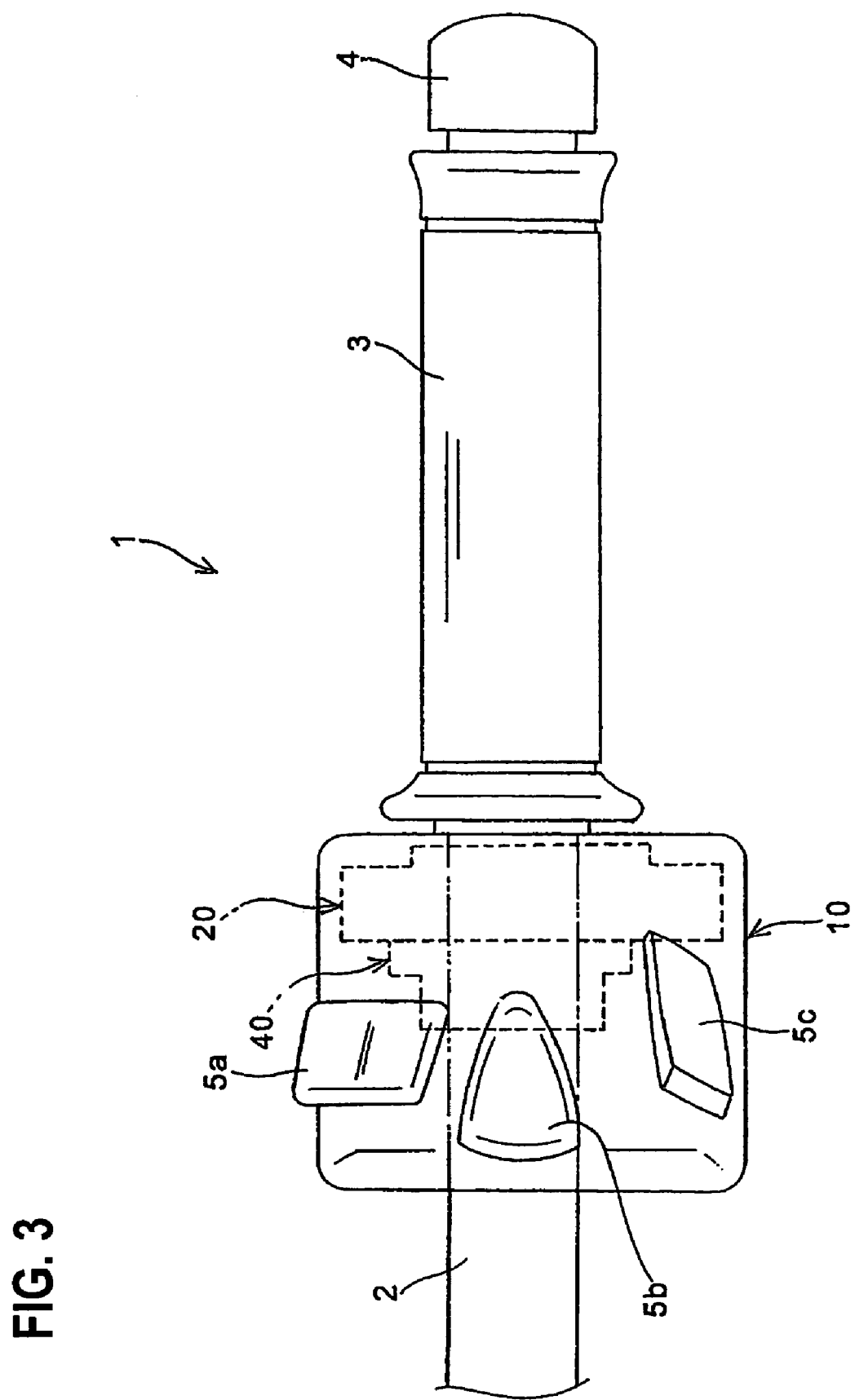
FIG. 3 is a front view of the throttle control apparatus according to the illustrative embodiment of the present invention.

FIG. 3 is a front view of the throttle control apparatus 1 according to the illustrative embodiment of the present invention. The throttle control apparatus 1 is mounted on a right end portion of the handlebar 2 which extends in the vehicle-width direction of the motorcycle. The handlebar is operable to steer the front wheel. A substantially cylindrical throttle control sleeve 6 made of a resin or the like (see FIG. 4) is pivotally supported on the handlebar 2 formed of a metal-made pipe or the like, such that the throttle control sleeve 6 is rotatable within a range of predetermined angle.

A handle grip 3 having a grip portion made of rubber or the like is mounted on an outer peripheral portion of the throttle control sleeve 6. The rider of the vehicle can steer the front wheel by gripping the handle grip 3 and, at the same time, can arbitrarily adjust a rotational angle of the handle grip 3 relative to the handlebar 2 thus adjusting an output of the engine (i.e., a drive source) of the vehicle.

Further, a substantially cylindrical throttle control housing 10 made of a resin or the like is fixed to a portion of the handlebar 2 on a more vehicle-body center side than a position of the handle grip 3. A plurality of handle switches is mounted on the throttle control housing 10. The plurality of handle switches may include, for example, a seesaw-type kill switch 5a, a push-button-type hazard lamp switch 5b, and a starter switch 5c. The rider of the vehicle can manipulate the respective switches by extending his/her thumb in a state that the rider grips the handle grip 3 with his/her right hand.

A throttle sensor unit 20 which detects a rotational angle of the throttle control sleeve 6 and a throttle return mechanism 40 which applies a biasing force in the direction so as to return the handle grip 3 to an initial position are housed inside the throttle control housing 10. The handle grip 3 is rotatably held on the handlebar 2 within a range of a predetermined angle, and at the same time, is always biased in the direction toward the initial position, that is, in the direction that the engine output is decreased due to the throttle return mechanism 40. Here, a grip end 4 is fixed to a right end portion of the handlebar 2.

Figure 4:
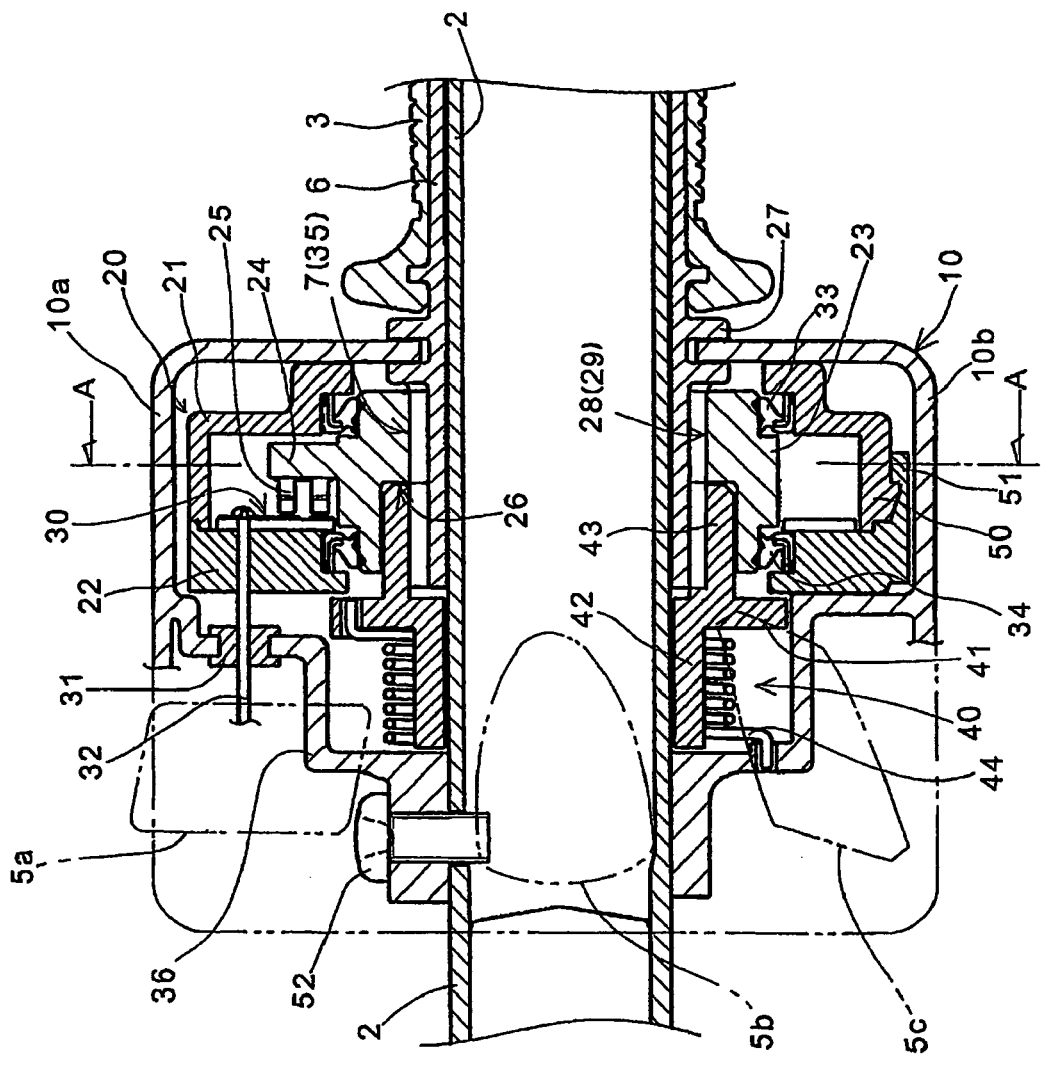
FIG. 4 is a partially enlarged cross-sectional view of the apparatus of FIG. 3.

FIG. 4 is a partially enlarged cross-sectional view of the throttle control apparatus shown in FIG. 3. Further, FIG. 5 is a cross-sectional view taken along a line A-A in FIG. 4.

Figure 5:
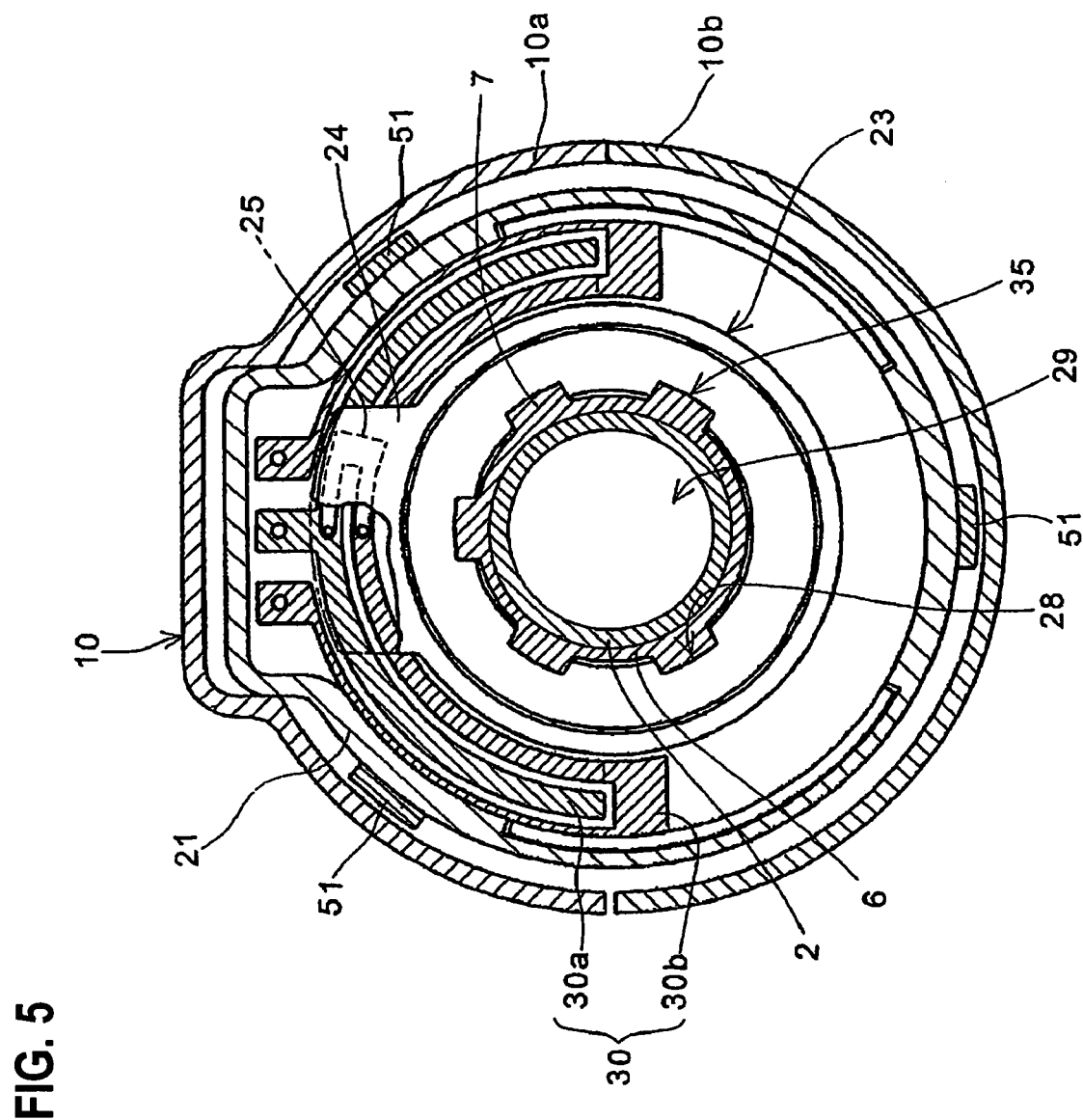
FIG. 5 is a cross-sectional view taken along a line A-A in FIG. 4.

As shown in FIGS. 3-5, the throttle control housing 10 includes an upper housing half body 10a and a lower housing half body 10b which are joined to each other using a plurality of screws (not shown) or the like. The upper housing half body 10a is fixed to the handlebar 2 using a positioning bolt 52.

Here, in the throttle control housing 10 according to the illustrative embodiment, a partition wall 36 is formed between a space where the throttle sensor unit 20 and the throttle return mechanism 40 are housed and a space where the handle switch is mounted. Due to such constitution, it is possible to enhance waterproof and dustproof property of the throttle sensor unit 20 and the throttle return mechanism 40. However, the throttle control housing 10 may be formed in various shapes, and may be formed in a shape in which such a partition wall 36 is not arranged in the throttle control housing 10.

A left end side of the throttle control sleeve 6 is inserted into the throttle control housing 10 so as to reach the substantially center of the throttle control housing 10. Further, an annular flange portion 27 is formed on the throttle control sleeve 6. The annular flange portion 27 sandwiches a side wall of the throttle control housing 10. The throttle control sleeve 6 is held on the handlebar 2 in a non-movable manner in the axial direction by joining the upper housing half body 10a and the lower housing half body 10b to each other. Further, a spline 35 consisting of five axial keys 7 is formed on a portion of an outer peripheral portion of the throttle control sleeve 6, on a more vehicle-body center side than the flange portion 27.

The throttle sensor unit 20 is formed of a resistance potentiometer. The throttle sensor unit 20 is formed in an annular shape and is fixed to an inner wall of the throttle control housing 10. The throttle sensor unit 20 includes a rotary member 23 having a movable contact 25 of the potentiometer is mounted thereon, a base member 22 having a fixed contact 30 of the potentiometer is mounted thereon, and a cover member 21 engaged with the base member 22. The rotary member 23, the base member 22, and the cover member 21 are made of plastic resin or the like. Alternatively, the rotary member 23, the base member 22, and the cover member 21 may be made of material having resin.

The throttle sensor unit 20 is assembled such that sealing members 33, 34 formed of an oil seal or the like are engaged with both sides of the rotary member 23 in the axial direction, and the rotary member 23 is sandwiched between the base member 22 and the cover member 21 from both sides of the rotary member 23. The base member 22 and the cover member 21 are fixed with each other by engaging an engaging pawl 50 formed on the cover member 21 with an engaging projection 51 formed on the base member 22 by fitting.

Due to such constitution, the inside of the sensor in which the fixed contact 30 and the movable contact 25 are housed can ensure high waterproof and dustproof property. Here, shapes or the like of the engaging pawl 50 and the engaging projection 51 may be variously modified, and the base member 22 and the cover member 21 may be fixed to each other using fastening members such as screws. A line 32, which is connected to the fixed contact 30 and outputs a sensor signal, is mounted on a back side of the base member 22. The line 32 penetrates a packing member 31 made of rubber or the like, and thereafter, is guided to the outside of the partition wall 36.

Further, a spline hole 29 having five key grooves 28 which agree with a spline shape (spline 35) of the throttle control sleeve 6 is formed in the rotary member 23. By engaging the throttle control sleeve 6 with the spline hole 29, the assembling of both of the throttle sensor unit 20 and the throttle control sleeve 6 is completed.

As described above, the throttle sensor unit 20 is formed as a module. Hence, the assembling of the throttle sensor unit 20 and the throttle control sleeve 6 can be completed merely by engaging the throttle sensor 20 and the throttle control sleeve 6 by spline fitting whereby the assembling operation can be easily performed.

Further, the throttle sensor 20 and the throttle control sleeve 6 can be simultaneously mounted on the handlebar 2 in a state that the throttle sensor unit 20 and the throttle control sleeve 6 are assembled with each other. Hence, the efficiency of the assembling operation of the throttle control apparatus 1 can be enhanced.

In this embodiment, firstly, the throttle sensor unit 20 and the throttle control sleeve 6 are mounted on the handlebar 2. Thereafter, the throttle control housing 10 is mounted on the handlebar 2 so as to cover the throttle unit sensor 20 and the throttle control sleeve 6 from above and below.

In this embodiment, the movement of the throttle control sleeve 6 in the axial direction is restricted by the flange portion 27. However, for example, even when a slight gap is formed between the flange portion 27 and the wall portion of the throttle control housing 10 so that the throttle control sleeve 6 may be allowed to move in the axial direction within a range of the gap, the throttle control sleeve 6 and the rotary member 23 are engaged with each other by spline fitting.

Hence, the axial movement of the throttle control sleeve 6 is not transmitted to the rotary member 23 of the throttle sensor unit 20. Accordingly, it is possible to prevent the occurrence of a phenomenon that an axial force is applied to the rotary member 23 and influences the sensor accuracy and the sealing property and the like of the sensor housing.

The movable contact 25 and the fixed contact 30 of the rotary member 23 which constitute the detection member for detecting a rotational angle of the throttle control sleeve 6 are formed of a conductive body made of metal or the like respectively. The movable contact 25 which is mounted on the projecting portion 24 of the rotary member 23 is brought into contact with the input-side fixed contact 30a and the output-side fixed contact 30b so as to electrically connect both contacts 30a, 30b with each other.

A contact position of the movable contact 25 with both contacts 30a, 30b is changed along with the rotation of the throttle control sleeve 6. Hence, an output current value from the line 32 is changed. In this embodiment, the throttle control apparatus is configured to decrease an electric resistance value generated on the fixed contact 30 along with the rotation of the throttle control sleeve 6 in the counterclockwise direction in the drawing from an initial position of the throttle control sleeve 6 on a right side.

Further, the throttle return mechanism 40 which applies a biasing force in the direction of returning the throttle control sleeve 6 to the initial position is arranged adjacent to the throttle sensor unit 20 in the axial direction. A coil spring 44 is wound around a main body portion 42 of the throttle return mechanism 40, and one end side of the coil spring 44 is engaged with the flange portion 41, and at the same time, another end portion of the coil spring 44 is engaged with the partition wall 36 of the throttle control housing 10.

A cylindrical projection 43 which is engaged with the throttle control sleeve 6 by spline fitting is formed on a right side of the main body portion 42 in the drawing (see FIG. 4). By inserting the projection 43 into the recessed portion 26 formed on the rotary member 23, the throttle return mechanism 40 and the throttle sensor unit 20 are arranged to overlap with each other in the axial direction. Due to such constitution, the throttle return mechanism 40 is arranged on a radially inner side of the throttle sensor unit 20 thus reducing an axial size of the throttle control apparatus whereby the miniaturization of the entire throttle control apparatus can be realized.

According to the above-mentioned constitution, the rotary member 23 of the throttle sensor unit 20 and the main body portion 42 of the throttle return mechanism 40 can be simultaneously engaged with the end portion of the throttle control sleeve 6 by spline fitting in a state that the rotary member 23 and the main body portion 42 overlap each other in the axial direction.

In this embodiment, it was found that although it is difficult to reduce a thickness of the throttle control apparatus in a direction orthogonal to an axis of the throttle sensor unit 20 from a viewpoint of the sensor accuracy, a manufacturing cost and the like, these properties are not influenced even when an axial length of the rotary member 23 which is engaged with the throttle control sleeve 6 by spline fitting is shortened.

Based on such finding, in this embodiment, the projection 43 of the throttle return mechanism 40 is inserted into the recessed portion of the rotary member 23 which is acquired by such shortening thus reducing a total width including a width of the throttle sensor unit 20 and a width of the throttle return mechanism 40 in the axial direction. Accordingly, the throttle control housing 10 can be miniaturized.

Further, due to such constitution, the throttle return mechanism 40, the throttle sensor unit 20 and the throttle control sleeve 6 can simultaneously be mounted on the handlebar 2 in a pre-assembled state. Hence, the efficiency of the assembling operation of the throttle control apparatus 1 can be further enhanced.

Here, the respective structures or the shapes of the throttle sensor unit 20 and the throttle return mechanism 40 are not limited to the above-mentioned embodiment, and various modifications are conceivable. For example, the rotary member 23 and the main body portion 42 of the throttle return mechanism 40 may be formed as an integral part of the throttle control apparatus 1.

Further, in this embodiment, the throttle control apparatus is configured such that the throttle return mechanism 40 and the throttle sensor unit 20 are arranged on a vehicle-body outer side (in the rightward direction in FIG. 4), and at the same time, the handle switches 5a, 5b and 5c are arranged on a vehicle-body center side (in the leftward direction in FIG. 4) with respect to the throttle control housing 10. Due to such an arrangement, the respective handle switches can be mounted in the throttle control housing 10 by effectively utilizing the space in the inside of the throttle control housing 10 thus realizing the miniaturization of the throttle control housing 10. Here, respective shapes and materials of the handlebar, the throttle control sleeve and the throttle control housing, a shape of a spline shaft-shaped portion formed on the throttle control sleeve, constitutions of the throttle sensor unit and the throttle return mechanism and the like are not limited to the above-mentioned constitutions and various modifications are conceivable. For example, as the sensor portion of the throttle sensor unit, a non-contact sensor using a Hall element may be adopted in place of the above-mentioned potentiometer. Further, on the throttle control apparatus, a friction mechanism which applies a proper resistance to the rotational operation of the throttle control sleeve may be provided. The friction mechanism is, for example, configured to utilize a slide resistance of a frictional body, and may be housed in the inside of the throttle control housing.

Although the present invention has been described herein with respect to a number of specific illustrative embodiments, the foregoing description is intended to illustrate, rather than to limit the invention. Those skilled in the art will realize that many modifications of the illustrative embodiment could be made which would be operable. For example, the throttle control apparatus according to the present invention is not limited to the motorcycle, and may be applicable to a vehicle such as a three-wheeled vehicle or a four-wheeled saddle-type vehicle which uses an engine or a motor as a drive source, and which uses a handlebar for steering.

All such modifications, which are within the scope of the claims, are intended to be within the scope and spirit of the present invention.

What is claimed is:

1. A throttle control apparatus comprising:
   a throttle control sleeve which is rotatably mounted onto a handlebar of a vehicle;
   a throttle control housing operatively attached to the handlebar, and rotatably engaged with an outer periphery of the throttle control sleeve; and
   a throttle sensor unit housed in the throttle control housing, said throttle sensor unit being operable to detect a rotational angle of the throttle control sleeve;
   wherein:
   a spline is formed on an outer peripheral surface of one end portion of the throttle control sleeve in an axial direction thereof, the spline comprising a plurality of spaced-apart keys;
   the throttle sensor unit is formed in an annular shape having a spline hole formed therein at a substantially central portion thereof, the spine hole having a plurality of grooves formed therein; and
   the throttle control sleeve and the throttle sensor unit are engaged with each other by spline fitting, with the keys of the spline fitting into the grooves of the spline hole.

2. A throttle control apparatus according to claim 1, further comprising a throttle return mechanism for applying a biasing force in a direction of returning the throttle control sleeve to an initial position thereof;
   wherein the throttle return mechanism is arranged adjacent to the throttle sensor unit and is engaged with the throttle control sleeve by spline fitting.

3. A throttle control apparatus according to claim 1, further comprising a throttle return mechanism having a projecting portion formed thereon; and the throttle sensor unit having a recessed portion formed therein;
   wherein the throttle sensor unit and the throttle return mechanism are arranged in an overlapping manner in the axial direction of the throttle control sleeve by engaging said projecting portion of the throttle return mechanism with said recessed portion of the throttle sensor unit.

4. A throttle control apparatus according to claim 2, wherein the throttle sensor unit and the throttle return mechanism are arranged in an overlapping manner in the axial direction of the throttle control sleeve by engaging a projecting portion formed on the throttle return mechanism with a recessed portion formed on the throttle sensor unit.

5. A throttle control apparatus according to claim 1, wherein the throttle sensor unit comprises a rotary member having the spline hole formed therein,
a detection member for detecting a quantity of rotation of the rotary member, and
a sensor housing for housing the rotary member and the detection member therein;
wherein said sensor housing is mounted on the throttle control housing in a non-rotatable manner.

6. A throttle control apparatus according to claim 2, wherein the throttle sensor unit comprises
   a rotary member having the spline hole formed therein,
   a detection member for detecting a quantity of rotation of the rotary member, and
   a sensor housing for housing the rotary member and the detection member therein;
   wherein said sensor housing is mounted on the throttle control housing in a non-rotatable manner.

7. A throttle control apparatus according to claim 3, wherein the throttle sensor unit comprises
   a rotary member having the spline hole formed therein,
   a detection member for detecting a quantity of rotation of the rotary member, and
   a sensor housing for housing the rotary member and the detection member therein;
   wherein said sensor housing is mounted on the throttle control housing in a non-rotatable manner.

8. A throttle control apparatus according to claim 1, wherein:
   at least one handle switch is mounted on the throttle control housing;
   the throttle sensor unit and the throttle return mechanism are arranged on a vehicle-body outer side of the throttle control housing; and
   said at least one handle switch is arranged on a vehicle-body center side of the throttle control housing.

9. A throttle control apparatus according to claim 2, wherein:
   at least one handle switch is mounted on the throttle control housing;
   the throttle sensor unit and the throttle return mechanism are arranged on a vehicle-body outer side of the throttle control housing; and
   said at least one handle switch is arranged on a vehicle-body center side of the throttle control housing.

10. A throttle control apparatus according to claim 3, wherein:
    at least one handle switch is mounted on the throttle control housing;
    the throttle sensor unit and the throttle return mechanism are arranged on a vehicle-body outer side of the throttle control housing; and
    said at least one handle switch is arranged on a vehicle-body center side of the throttle control housing.

11. A throttle control apparatus according to claim 5, wherein:
    at least one handle switch is mounted on the throttle control housing;
    the throttle sensor unit and the throttle return mechanism are arranged on a vehicle-body outer side of the throttle control housing; and
    said at least one handle switch is arranged on a vehicle-body center side of the throttle control housing.

12. A vehicle, comprising:
    a handlebar;
    a throttle control sleeve rotatably mounted onto the handlebar;

a throttle control housing fixed to the handlebar, and rotatably engaged with an outer periphery of the throttle control sleeve; and a throttle sensor unit housed in the throttle control housing, said throttle sensor unit being operable to detect a rotational angle of the throttle control sleeve;

wherein:

a spline is formed on an outer peripheral surface of one end portion of the throttle control sleeve in an axial direction thereof, the spline comprising a plurality of spaced-apart keys;

the throttle sensor unit is formed in an annular shape having a spline hole formed therein at a substantially central portion thereof, the spine hole having a plurality of grooves formed therein; and the throttle control sleeve and the throttle sensor unit are engaged with each other by spline fitting, with the keys of the spline fitting into the grooves of the spline hole.

13. A throttle control apparatus according to claim 12, further comprising a throttle return mechanism for applying a biasing force in a direction of returning the throttle control sleeve to an initial position thereof;

wherein the throttle return mechanism is arranged adjacent to the throttle sensor unit, and is engaged with the throttle control sleeve by spline fitting.

14. A vehicle according to claim 12, further comprising a throttle return mechanism having a projecting portion formed thereon; and the throttle sensor unit having a recessed portion formed therein;

wherein the throttle sensor unit and the throttle return mechanism are arranged in an overlapping manner in the axial direction of the throttle control sleeve by engaging said projecting portion of the throttle return mechanism with said recessed portion of the throttle sensor unit.

15. A vehicle according to claim 13, wherein the throttle sensor unit and the throttle return mechanism are arranged in an overlapping manner in the axial direction of the throttle control sleeve due to the engagement of a projecting portion which is formed on the throttle return mechanism and a recessed portion which is formed on the throttle sensor unit.

16. A vehicle according to claim 12, wherein the throttle sensor unit includes a rotary member having the spline hole formed therein, a detection member for detecting a quantity of rotation of the rotary member, and a sensor housing for housing the rotary member and the detection member therein;

wherein said sensor housing is mounted on the throttle control housing in a non-rotatable manner.

17. A vehicle according to claim 12, further comprising a throttle return mechanism for applying a biasing force in a direction of returning the throttle control sleeve to an initial position thereof;

wherein:

at least one handle switch is mounted on the throttle control housing;

the throttle sensor and the throttle return mechanism are arranged on a vehicle-body outer side of the throttle control housing; and said at least one handle switch is arranged on a vehicle-body center side of the throttle control housing.

18. A motorcycle, comprising:

a main frame comprising a head pipe;

a handlebar supported by said head pipe;

a throttle control apparatus operatively attached to said handlebar, said throttle control apparatus comprising:

a throttle control sleeve which is rotatably mounted onto the handlebar;

a throttle control housing fixed to the handlebar, and rotatably engaged with an outer periphery of the throttle control sleeve; and a throttle sensor unit housed in the throttle control housing, said throttle sensor unit operable to detect a rotational angle of the throttle control sleeve;

wherein:

a spline is formed on an outer peripheral surface of one end portion of the throttle control sleeve in an axial direction thereof, the spline comprising a plurality of spaced-apart keys;

the throttle sensor unit is formed in an annular shape having a spline hole formed therein at a substantially central portion thereof, the spine hole having a plurality of grooves formed therein; and the throttle control sleeve and the throttle sensor unit are engaged with each other by spline fitting, with the keys of the spline fitting into the grooves of the spline hole.

19. A motorcycle according to claim 18, further comprising a throttle return mechanism for applying a biasing force in a direction of returning the throttle control sleeve to an initial position thereof;

wherein the throttle return mechanism is arranged adjacent to the throttle sensor unit and is engaged with the throttle control sleeve by spline fitting.

20. A motorcycle according to claim 18, further comprising a throttle return mechanism having a projecting portion formed thereon; and the throttle sensor unit having a recessed portion formed therein;

wherein the throttle sensor unit and the throttle return mechanism are arranged in an overlapping manner in the axial direction of the throttle control sleeve by engaging said projecting portion of the throttle return mechanism with said recessed portion of the throttle sensor unit.

* * * * *